United States Patent [19]

Hattori et al.

[11] 4,403,505

[45] Sep. 13, 1983

[54] IGNITION RANGE DETECTOR FOR INTERNAL COMBUSTION ENGINE

[75] Inventors: Tadashi Hattori, Okazaki; Hiroaki Yamaguchi, Anjo; Tadashi Ozaki, Gamagori, all of Japan

[73] Assignee: Nippon Soken, Inc., Nishio, Japan

[21] Appl. No.: 317,405

[22] Filed: Nov. 2, 1981

[30] Foreign Application Priority Data

Nov. 7, 1980 [JP] Japan .................. 55-156790

[51] Int. Cl.$^3$ .................................. G01M 15/00
[52] U.S. Cl. ........................... 73/117.3; 73/115
[58] Field of Search ............... 73/115, 116, 117.3, 73/118

[56] References Cited

U.S. PATENT DOCUMENTS 2,919,576  1/1960  Weller, Jr. et al. ............ 73/115
4,003,248  1/1977  Leichle ........................... 73/116

Primary Examiner—Jerry W. Myracle
Attorney, Agent, or Firm—Cushman, Darby & Cushman

[57] ABSTRACT

The pressure in the cylinder $Pi(-\Theta A)$ at the fixed angle $-\Theta A$ preceding to maximum ignition advance at the time of each combustion is determined from the output signal of a pressure detector for detecting the pressure in the cylinder of the internal combustion engine. The pressure in the cylinder $Pi(+\Theta B)$ at a predetermined angle $+\Theta B$ during the expansion process is also determined. It is decided whether the ratio $Pi(+\Theta B)/Pi(-\Theta A)$ is larger or smaller than a predetermined value $\beta$ thereby to detect an ignition range always regardless of the running conditions of the internal combustion engine.

3 Claims, 23 Drawing Figures

IGNITION RANGE DETECTOR FOR INTERNAL COMBUSTION ENGINE

BACKGROUND OF THE INVENTION

1. Field of the Invention

The present invention relates to a system for detecting the ignition range of the internal combustion engines.

A detector for detecting the ignition range of the internal combustion engine is advantageous for control of the air-fuel ratio, the EGR (exhaust gas recirculation) and ignition timing.

2. Description of the Prior Art

The importance of an ignition range detector will be described with reference to a conventional method of air-fuel ratio control.

FIG. 1 is a graph showing the relation between air-fuel ratio of the mixture supplied to a combustion chamber of the internal combustion engine, the composition of the exhaust gas and the fuel consumption rate with respect to NOx, HC and CO. If the mixture is capable of being controlled to the neighborhood of the optimum lean air-fuel ratio (the air-fuel ratio where the fuel may be completely combusted before the increase of HC by misfire) in the area (x) of FIG. 1, the harmful components CO and HC of the exhaust gas are minimized. Under this condition, the component NOx is reduced as compared with in the area at or near the generally used stoichiometric air-fuel ratio, thereby contributing to an improved purification of the exhaust gas. Further, the fuel consumption rate is lowest at or near the optimum lean air-fuel ratio, resulting in high economy.

It is therefore desirable to control the mixture gas to or near the optimum lean air-fuel ratio to attain an economically advantageous purification of the exhaust gas. In reality, however, it is difficult to maintain the air-fuel mixture at the air-fuel ratio immediately before misfire, so that the mixture gas is ignited in an area considerably richer than the optimum lean air-fuel ratio for the sake of security.

In order to solve this problem, it is necessary to develop means for detecting the air-fuel ratio immediately before misfire. Conventional means for directly detecting the air-fuel ratio of the mixture includes an air-fuel ratio detector using a solid electrolyte such as zirconium oxide or zirconia. The zirconia air-fuel ratio detector, however, has the disadvantage that it is incapable of detecting the stoichiometric air-fuel ratio but only the neighbourhood thereof (the air-fuel ratio 14.5 to 15.0 in FIG. 1).

The air-fuel ratio immediately before misfire is thus required to be detected indirectly. The optimum lean air-fuel ratio, which is one where the complete combustion is effected immediately before misfire as mentioned above, may be detected at a point slightly richer than the air-fuel ratio associated with the condition (partial combustion) immediately before misfire.

It is therefore possible to detect the air-fuel ratio by an ignition range detector for detecting the condition immediately before misfire (partial combustion).

An ignition range detector is useful as will be seen from the foregoing description about the air-fuel ratio.

The diagram of FIG. 2 shows the difference in the waveform of pressure in the cylinder of the internal combustion engine as a general according to the combustion conditions.

In FIG. 2, the in-cylinder pressures $P_1(+\Theta A)$ and $P_1(+\Theta B)$ for complete combustion at predetermined angles $+\Theta A$ and $+\Theta B$ respectively during the explosion-combustion process (expansion stroke) are larger than the in-cylinder pressures $P_1'(-\Theta A)$ and $P_1'(+\Theta B)$ respectively associated with partial combustion immediately before misfire. It is therefore possible to decide whether completion combustion or partial combustion immediately before misfire is involved by measuring the pressure in the cylinder at a predetermined angle of the internal combustion engine during the expansion process for combustion and comparing the result thereof with a predetermined value. An ignition range is accordingly capable of being detected by utilizing the result of such comparison.

The diagram of FIG. 3 shows the difference in the waveform of pressure in the cylinder of the internal combustion engine in general according to the load conditions.

Depending on the operating conditions of the internal combustion engine, the pressure $Pi(+\Theta B)$ is considerably different at a predetermined angle during the expansion process for completely combusted conditions. If a predetermined value for comparison ($k_1 =$ a fixed value) is determined for combustion under high load, the pressure value $P_2(+\Theta B)$ is smaller than the predetermined value and it is wrongly decided that partial combustion immediately before misfire is involved in spite of complete combustion under a small load. In order to solve this problem, the in-cylinder pressure $P(-\Theta A)$ for the fixed angle $-\Theta A$ before the maximum ignition advance angle (involving the compression process alone) is determined as an initial condition each time of combustion, and the value $Pi(-\Theta A)$ determined from this initial condition is divided by the predetermined angle $Pi(+\Theta B)$ during the expansion process. The result of division is compared with a predetermined value $\beta$, thus making it possible to decide at a predetermined level whether partial combustion immediately preceding to misfire or complete combustion is involved regardless of the load as shown in FIG. 3. In other words, the ignition range can be determined without regard to the running conditions including the load.

SUMMARY OF THE INVENTION

Accordingly, it is an object of the present invention to provide an ignition range detector in which the pressure in the cylinder $Pi(-\Theta A)$ for the fixed angle $-\Theta A$ preceding to the maximum ignition advance angle is determined from the signal produced from a pressure detector for detecting the pressure in the cylinder at the time of each combustion on the one hand and the in-cylinder pressure $Pi(+\Theta B)$ for a predetermined angle $+\Theta B$ during the expansion process is determined on the other hand, so that by deciding whether or not the ratio between these two values $Pi(+\Theta B)/Pi(-\Theta A)$ exceeds the predetermined value $\beta$, an ignition range is always detected without regard to the engine running conditions including the loads.

BRIEF DESCRIPTION OF THE DRAWINGS

Preferred embodiments of the present invention will be now described in conjunction with the accompanying drawings, in which.

DESCRIPTION OF THE PREFERRED EMBODIMENTS

A system for detecting the ignition range for the internal combustion engine according to the present invention will be described in detail with reference to an embodiment.

Figure 1:
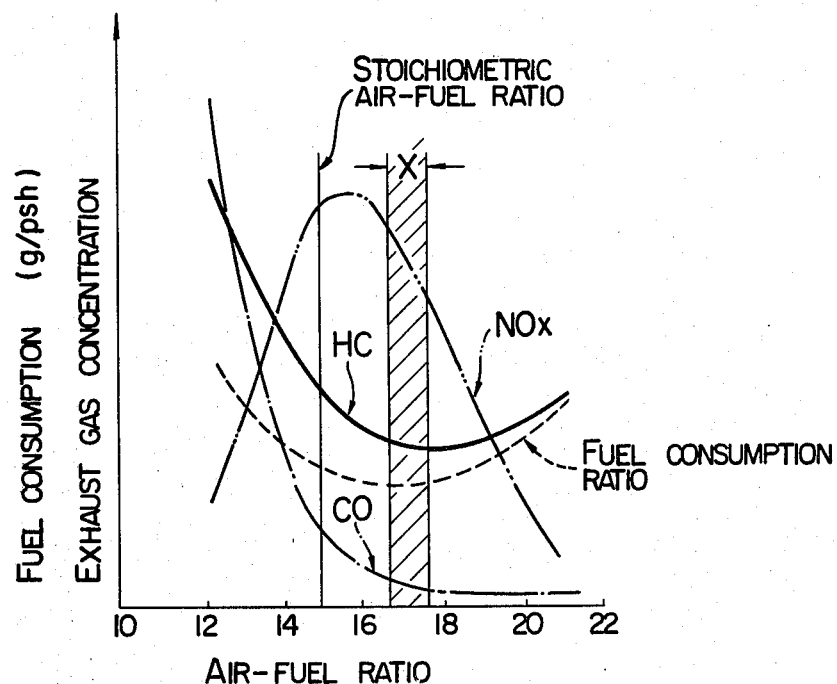
FIG. 1 is a graph showing the relation between the air-fuel ratio, the composition of the exhaust gas and the fuel consumption rate of the internal combustion engine in general.
Figure 2:
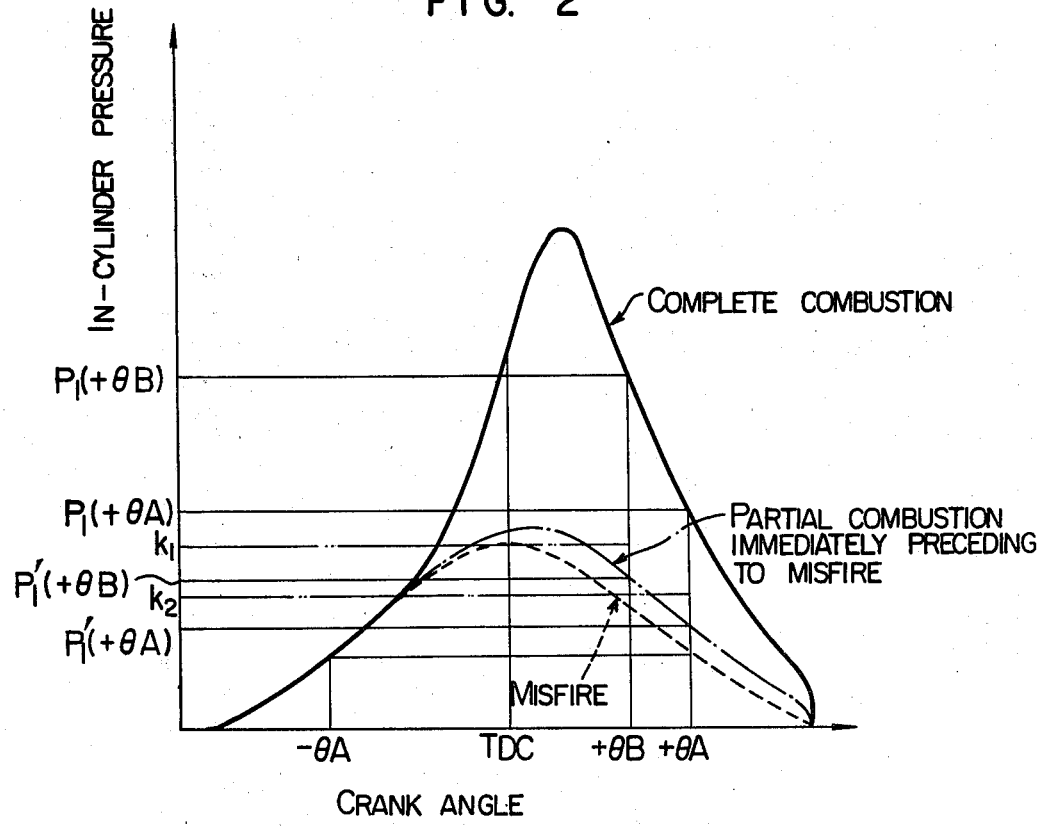
FIG. 2 is a graph showing the difference in the waveform of in-cylinder pressure of the internal combustion engine in general according to the combustion conditions.
Figure 3:
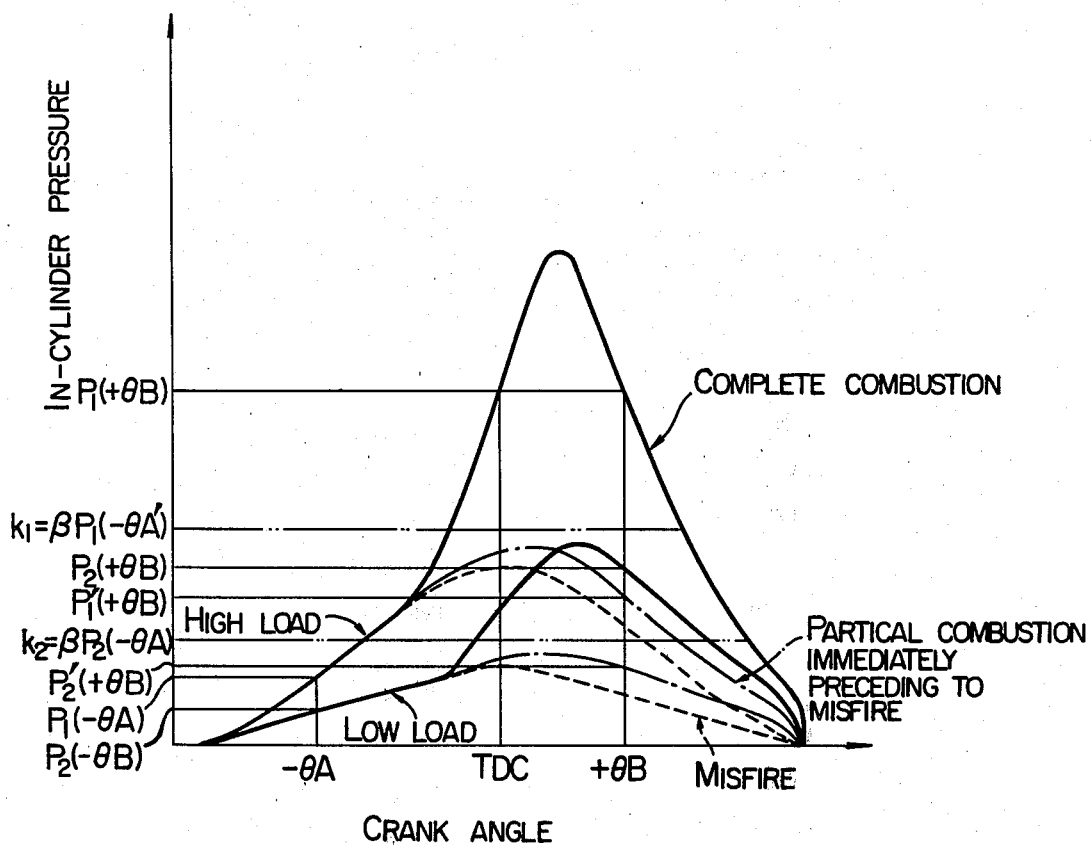
FIG. 3 is a graph showing the difference in the waveform of in-cylinder pressure of the internal combustion engine in general according to the load conditions.
Figure 4:
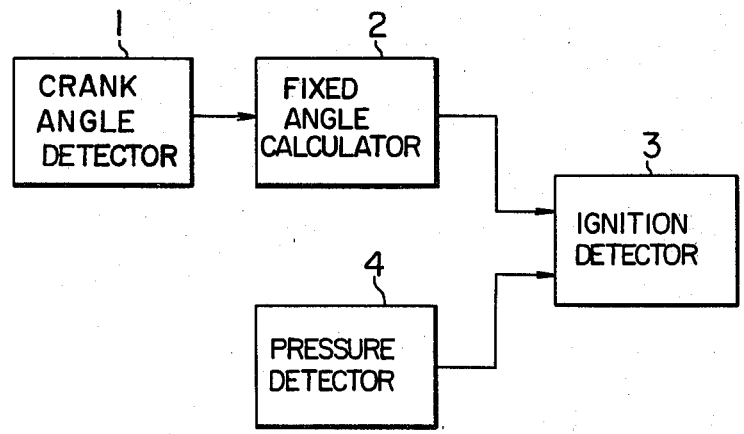
FIG. 4 is a block diagram showing an embodiment of the ignition range detector for the internal combustion engine according to the present invention.

A block diagram of a system for detecting the ignition limit of the internal combustion engine according to the present invention is shown in FIG. 4. Reference numeral 1 designates an crank angle detector for detecting two crank angles in the entire process of each cylinder of a four-cycle internal combustion engine, one of the angular positions being a fixed angle $\Theta B$. Numeral 2 designates a fixed angle calculator circuit for calculating a fixed angle $-\Theta A$ from the angular position detection signal produced from the angular position detector 1. Numeral 3 designates an ignition detector circuit for detecting whether completion combustion or partial combustion immediately preceding to misfire is involved. Numeral 4 designates a pressure detector for detecting the pressure in the cylinder of the internal combustion engine.

Detailed circuits of the ignition range detecting system for the internal combustion engine according to the present invention will be now explained with reference to FIGS. 5 to 9.

Figure 5:
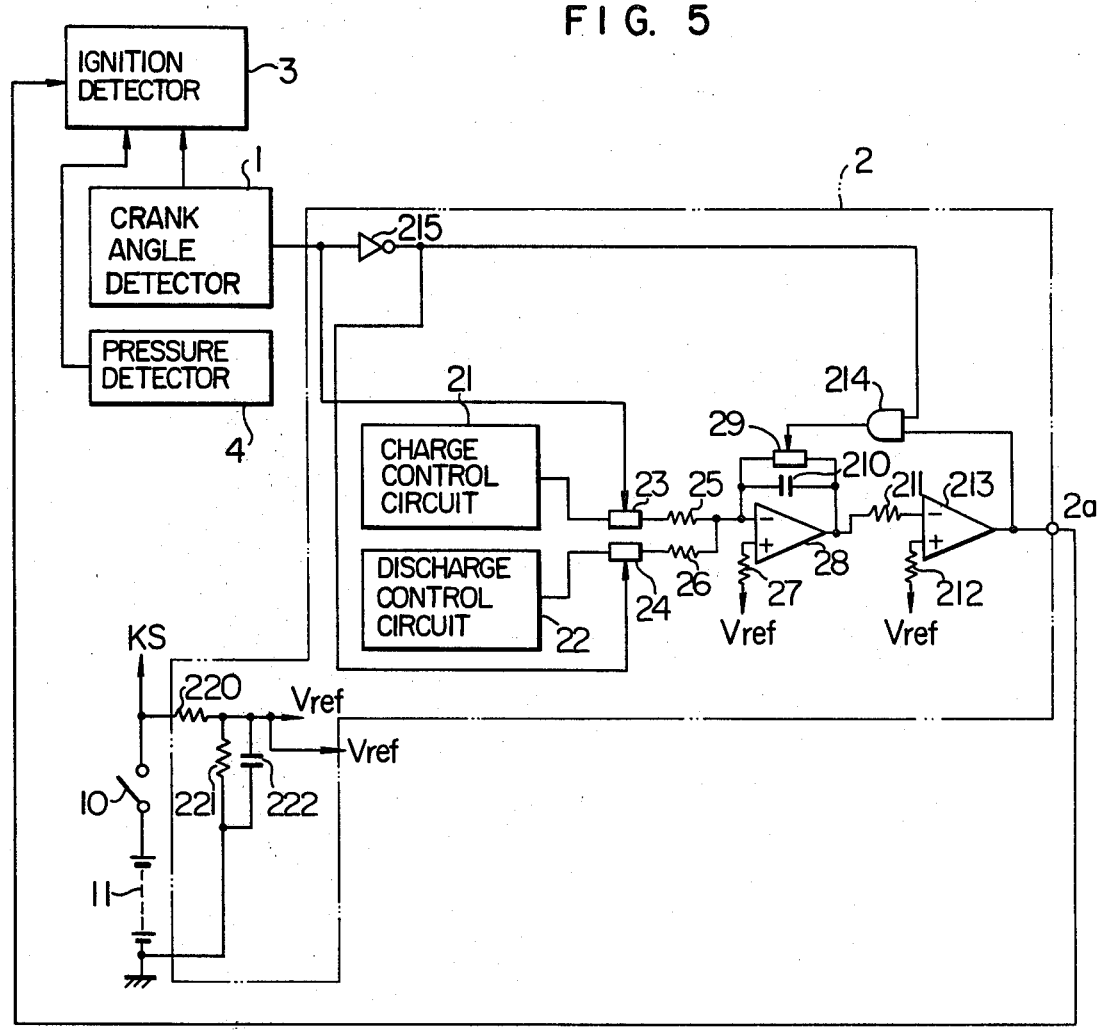
FIGS. 5, 6, 8, 9, 10, 12 and 13 show, embodiments of detailed circuits of the system according to the present invention.

A specific example of the fixed angle calculator circuit is shown in FIG. 5. A reference voltage Vref is produced from resistors 220, 221 and a capacitor 222, and is applied through resistors 27 and 212 to operational amplifiers 28 and 213 respectively described below.

The fixed angle calculator circuit 2 further includes a NOT circuit 215, a charge control circuit 21, a discharge control circuit 22, analog switches 23, 24 and 29 turned on in response to a "1" signal, a charge resistor 25, a discharge resistor 26, resistors 27, 212 connected to a reference voltage Vref, an input resistor 211, operational amplifiers 28, 213, a capacitor 210 and an AND circuit 214. The resistors 25, 26, 27, the capacitor 210 and the operational amplifier 28 make up a Miller integrator circuit. When the input voltage is lower than the reference voltage Vref, the capacitor 210 is charged, whereas when the input voltage is higher than the reference voltage Vref, the capacitor 210 is discharged. The resistors 211, 212 and the operational amplifier 213 make up a comparator circuit. The analog switches 23, 24 and 29 are suitably comprised of a field effect transistor. Numeral 10 designates a key switch, numeral 11 a battery providing a power supply, KS a power terminal connected to the power supply 11 through the key switch 10.

Figure 6:
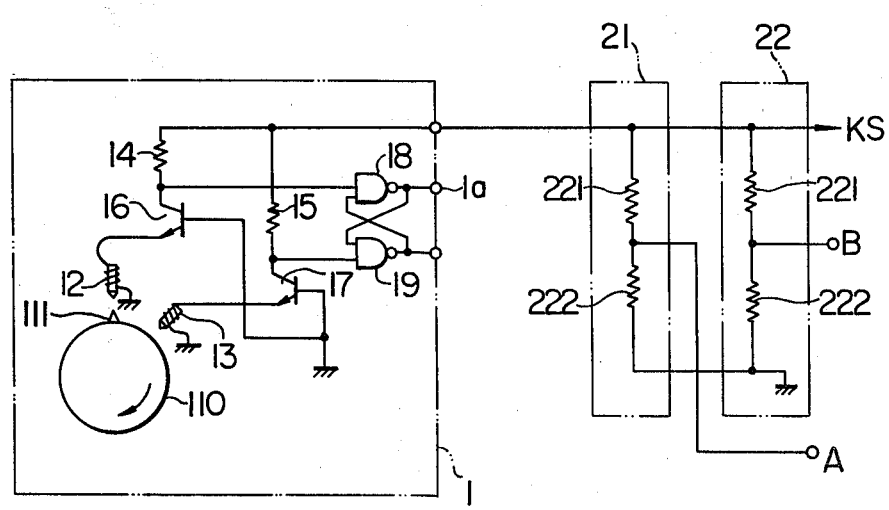
Figure 7:
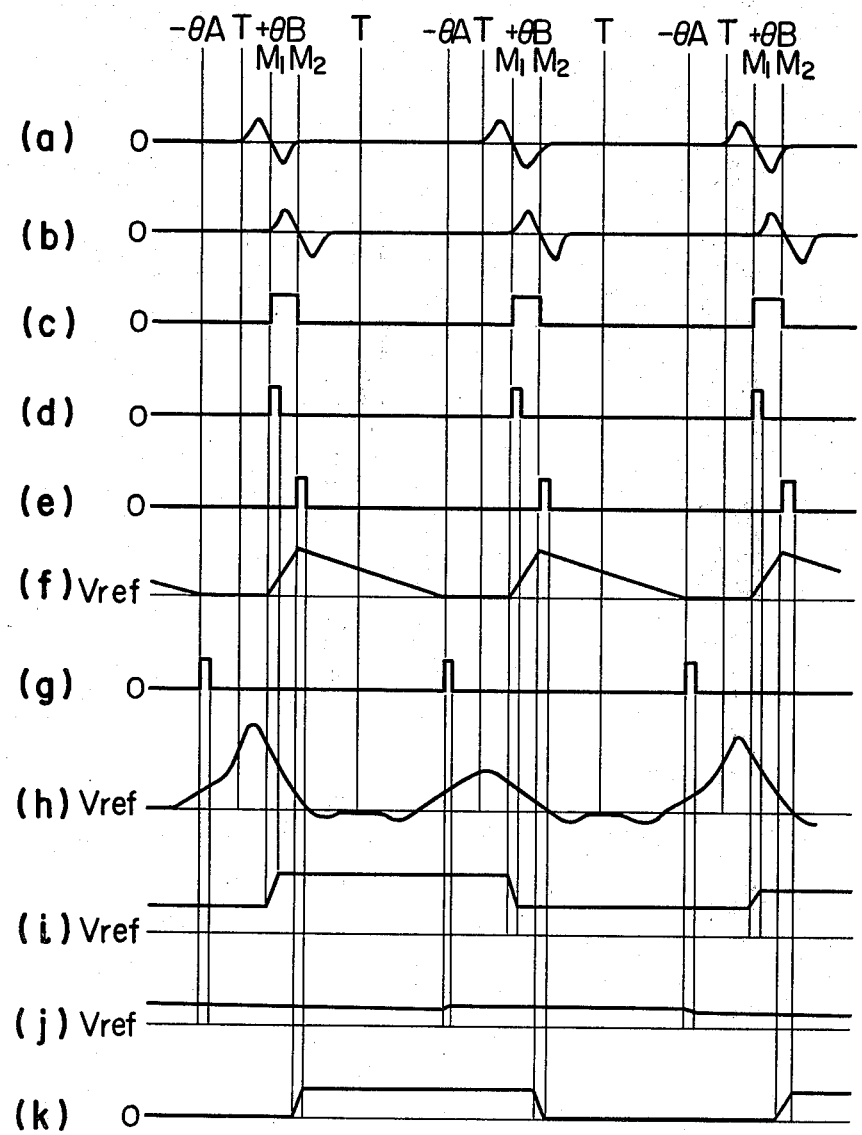
FIG. 7($a-k$) is a time chart for explaining the operation of the system according to the present invention.

The diagram of FIG. 6 shows the details of the angular position detector circuit 1, the charge control circuit 21 and the discharge control circuit 22 of the fixed angle calculator circuit 2. A time chart for explaining the operation of the system according to the present invention is shown in FIG. 7.

The charge control circuit 21 includes resistors 211 and 212, and has an output terminal A for producing a predetermined potential lower than the reference potential Vref by division through the resistors.

The discharge control circuit 22, on the other hand, includes resistors 221 and 222 and has an output terminal B for producing a predetermined potential always higher than the reference potential Vref by division through the resistors. A fixed angle $\Theta A$ representing a predetermined crank angle is determined by the fixed angle calculator circuit 2.

In the angular position detector 1 of FIG. 6, numeral 110 designates a rotor having a protrusion 111 on the outer periphery thereof, which rotor 110 is fixed on a distributor shaft not shown of the internal combustion engine, so that the rotor 110 rotates together with the distributor shaft. Numerals 12 and 13 designate first and second electromagnetic pickups respectively arranged in opposition to the protrusion 111 of the rotor 110 in spaced relation by a predetermined angle to each other along the circumference of the rotor 110. Numerals 16 and 17 show transistors connected to the electromagnetic pickups 12 and 13, and numerals 14 and 15 designate resistors. Numerals 18 and 19 designate a NAND circuit making up a flip-flop, one of the inputs of which is connected to the collector of the transistor 16, the other input thereof being connected to the collector of the transistor 17.

During two rotations of the crank shaft not shown, the rotor 110 makes a revolution along the arrow. When the protrusion 111 of the rotor 110 crosses the line extending from the electromagnetic pickups 12 and 13, the electromagnetic pickups 12 and 13 produce negative-going signals as shown in FIGS. 7($a$) and 7($b$) respectively. In this way the electromagnetic pickups 12 and 13 detect the angular positions $M_1$ and $M_2$ respectively shown in FIG. 7. Upon generation of negative signals from the electromagnetic pickups 12 and 13 the transistors 16 and 17 begin to conduct respectively, whereupon a flip-flop circuit including the NAD circuits 18 and 19 is actuated, so that the output as shown in FIG. 7($c$) is produced at the output terminal 1$a$ of the flip-flop.

Figure 8:
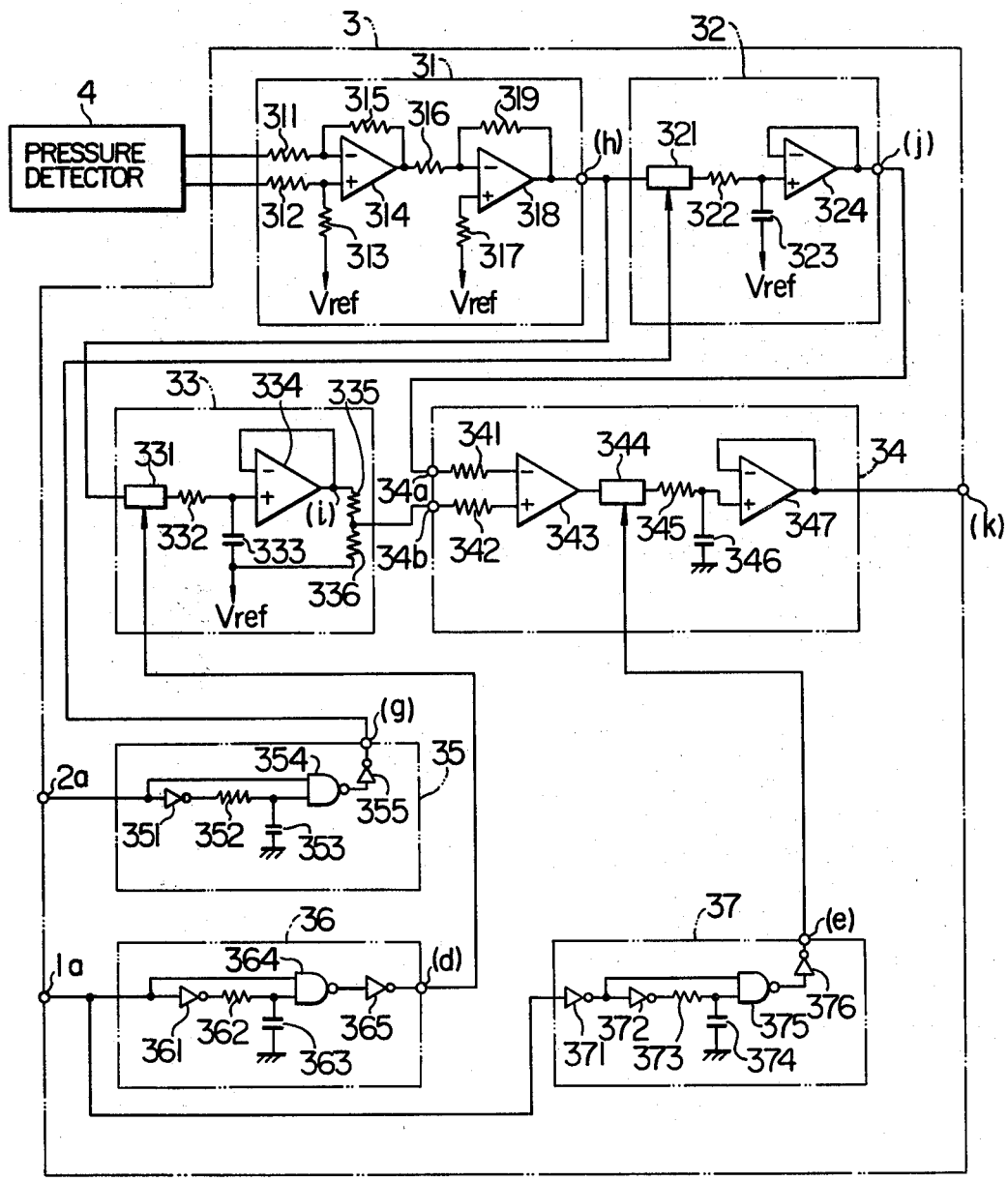

The ignition detector circuit 3 is shown in detail in FIG. 8. The pressure detector 4 is a pressure sensor mounted on the cylinder of the engine. The output potential of this sensor increases with the increase in the pressure of the cylinder. The ignition detector circuit 3 decides whether completion combustion or partial combustion immediately preceding misfire is involved through a decision circuit for deciding whether the predetermined value $\beta$ is exceeded or not by the value $Pi(+\Theta B)/Pi(-\Theta A)$ determined by a first fixed angle pressure detector circuit for detecting the pressure $Pi(-\Theta A)$ in the cylinder at the predetermined fixed angle $-\Theta A$ before explosion of the mixture gas in the cylinder and a second fixed angle pressure detector circuit for detecting the pressure Pi(+ΘB) in the cylinder at the predetermined fixed angle ΘB after the top dead center (TDC) associated with the combustion of the mixture gas.

In this ignition detector circuit 3, numeral 31 designates a signal processing circuit for processing the signal from the pressure detector 4. The processing circuit 31 includes resistors 311, 312, 313, 315, 316, 317, 319 and operational amplifiers 314, 318. The resistors 313 and 317 are connected to the reference potential Vref. The output of the signal processing circuit is as shown in FIG. 7(h). Numeral 35 designates a monostable circuit for generating a monostable output (g) from the fixed angle ΘA as shown in FIG. 7(g) in response to the output of the fixed angle calculator circuit 2. This monostable circuit includes NOT circuits 351, 355, a NAND circuit 354, a resistor 352 and a capacitor 353. Numerals 36 and 37 show monostable circuits for generating monostable outputs (d) and (e) as shown in FIG. 7 from the output 1a of the angle angular position detector 1. The monostable circuit 36 includes NOT circuits 361, 365, a NAND circuit 364, a resistor 362 and a capacitor 363 for generating the monostable output (d) from the fixed angle ΘB. The monostable circuit 37, on the other hand, includes NOT circuits 371, 372, 376, a NAND circuit 375, a resistor 373 and a capacitor 374 for generating a monostable output (e) as shown in FIG. 7.

Numeral 32 designates a hold circuit including an analog switch 321, a resistor 322, a capacitor 323 connected to the reference potential Vref and an operational amplifier 324 for holding the value Pi(−ΘA) as shown in FIG. 7(j) of the pressure waveform at the fixed angle −ΘA, thus making up a first fixed angle pressure detector circuit. The section designated by numeral 33 is a second fixed angle pressure detector circuit comprising a hold circuit including an analog switch 331, a resistor 322, a capacitor 333 connected to the reference potential Vref and an operational amplifier 334, and dividing resistors 335 and 336. The hold circuit is adapted to hold the value Pi(+ΘB) of the pressure waveform at the fixed angle +ΘB each time as shown in FIG. 7(i). The value of pressure waveform thus held is divided by the dividing resistors 335 and 336, and the result division Pi(+ΘB)/β makes up an output of the second fixed angle pressure detector.

Numeral 34 designates a decision circuit comprising a comparator including resistors 341, 342 and an operational amplifier 343, and a hold circuit including an analog switch 344, a resistor 345, a capacitor 346 and an operational amplifier 347.

The decision circuit 34 is such that when the output Pi(+ΘB)/β is larger than the output Pi(−ΘA), in response to the output (j) Pi(−ΘA) of the fixed angle pressure detector circuit 32 and the output Pi(+ΘB)/β of the second fixed angle pressure detector circuit 33, the comparator produces a "1" signal indicative of the complete combustion, which signal is picked up at the monostable output (e) by the hold circuit as shown in FIG. 7(k). In the case where the output Pi(+ΘB) is smaller than the output Pi(−ΘA), on the other hand, the comparator produces an output of "0" level indicative of the partial combustion immediately preceding to misfire, which signal is similarly picked up by the hold circuit.

Now, the operation of an ignition range detector of the above-described embodiment according to the present invention will be described with reference to the time chart of FIG. 7. In FIG. 7, reference character T designates the top dead center. The angular position detector 1 is for generating a rectangular pulse in synchronism with the rotations of the crank shaft of the internal combustion engine not shown. As shown in FIG. 7(c), a "1" signal is produced during the period from $M_1$ to $M_2$, and a "0" signal is produced during the period from $M_2$ to $M_1$ at the output terminal 1a, so that an output of 1-pulse/1-cycle is produced for two rotations of the internal combustion engine. When the output of the angle detector 1 is raised to "1", the analog switch 23 of the fixed angle calculator circuit 2 is turned on. Since the output of the NOT circuit 215 at "0" level, the analog switch 24 is turned off. Also, since the output signal of the AND circuit 214 is "0" with the capacitor-resetting analog switch 29 turned off, the capacitor 210 is charged by the charge control circuit 21 from the time point of $M_1$ on the side of reference voltage Vref as shown in FIG. 7(e). Since the output voltage A of the charge control circuit 21 is constant, however, the charge current is constant. The charging of the capacitor 210 causes the output of the operational amplifier 28 to be higher than the reference potential Vref, thus reducing the output of the comparator circuit to "0".

When the signal at the output terminal 1a of the angular position detector 1 is reduced to "0" level at time point $M_2$, the analog switch 23 is turned off and the analog switch 24 is turned on, so that the capacitor 210 begins to discharge as shown in FIG. 7(e) by a predetermined discharge current due to the predetermined potential (B) of the discharge control circuit 22. At the time point when the discharge of the capacitor 210 ends, the output of the operational amplifier 28 becomes lower than the reference potential Vref, and therefore the output of the comparator is reversed to "1" level. The output of the AND circuit 214 is raised to "1", and the analog switch 29 is turned on, so that the output of the operational amplifier 28 is maintained constant at the reference potential Vref as shown in FIG. 7(e).

In this way, since the output potential A of the charge control circuit 21 and the output potential B of the discharge control circuit 22 are constant and both the charge current and charge voltage are constant, a fixed angular position signal is always produced at the predetermined fixed angular position ΘA at the output terminal 2a regardless of the engine rotational speed.

The monostable outputs (d), (e) and (g) are produced at the ignition detector circuit 3 as shown in FIG. 7. In response to the monostable output (d), the value Pi(−ΘA) is detected by the first fixed angle pressure detector 32 at each fixed angle −ΘA during the compression process and maintained till the next fixed angle −ΘA. In response to the monostable output (d), on the other hand, the value Pi(+ΘB)/β is detected by the second fixed angle pressure detector circuit 33 at each fixed angle ΘB during the expansion process and maintained until the next fixed angle ΘB.

The values Pi(−ΘA) and Pi(+ΘB)/β detected at the fixed angle pressure detector circuits 32 and 33 are compared with each other at the decision circuit 34, and the result thereof is maintained from $M_2$ to the next $M_2$ by the monostable output (e). When the value Pi(+ΘB)/β is larger than the value Pi(−ΘA), that is, when the value Pi(+ΘB)/Pi(−ΘA) is larger than the predetermined value β, a "1" output indicative of complete combustion is produced, whereas when the value Pi(+ΘB)/β is smaller than the value Pi(−ΘA), that is, when Pi($+\Theta B$)/Pi($-\Theta A$) is smaller than the predetermined value $\beta$, a "0" output indicative of partial combustion immediately preceding misfire is produced. As seen from above, the values Pi($-\Theta A$) and Pi($-\Theta B$) are determined and the ratio therebetween Pi($+\Theta B$)/Pi($+\Theta A$) is compared with the predetermined value $\beta$, so that the partial combustion immediately preceding to misfire, namely, the ignition range is capable of being detected.

The embodiment mentioned above deals with a detector for detecting the ignition range for a single cylinder, and the same principle applies with equal effect to a plurality of cylinders.

Figure 9:
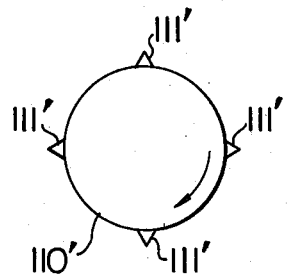

Another embodiment 110' of the rotor 110 is shown in FIG. 9. In FIG. 9, an example having four cylinders is shown. The rotor 110 of the angular position detector 1 shown in FIG. 6 is replaced by a rotor 110' having four protrusions 111' equidistantly arranged on the outer periphery thereof in such a manner as to produce two rectangular pulses of two cycles at each two rotations of the internal combustion engine.

Figure 10:
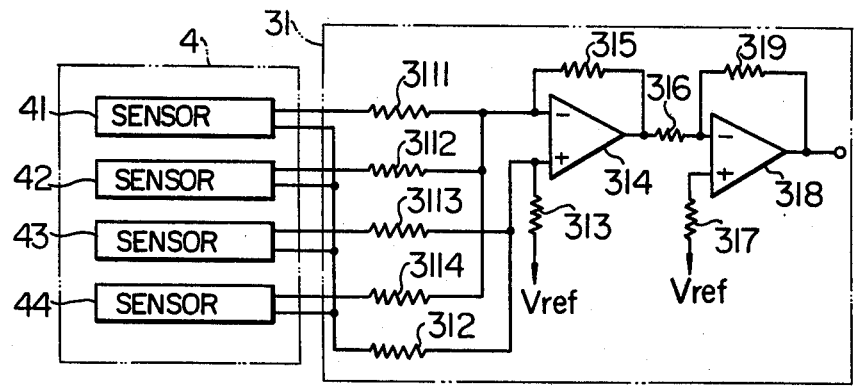

The pressure detector 4 and the signal processing circuit 31 are shown in detail in FIG. 10.

In FIG. 10, the resistor 311 is replaced by four resistors 3111, 3112, 3113 and 3114 corresponding to the detectors 41, 42, 43 and 44 respectively and connected to the operational amplifier 314 so that the processing circuit 31 may have an adding function thereby to perform a similar measurement.

Simple addition for the four cylinders poses no problem since the pressure change during the suction and exhaust processes is so small that the effect of the other cylinders is substantially small.

Figure 11:
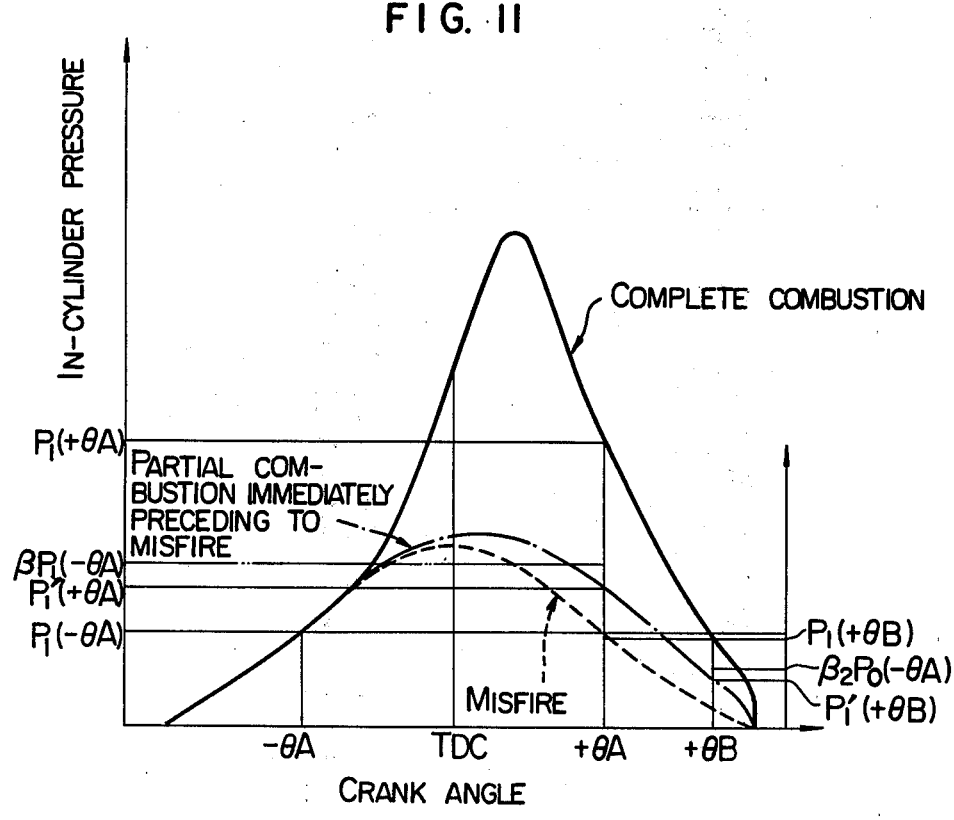
FIG. 11 is a diagram showing the relation between the predetermined value $\beta$ and the fixed angles $\Theta A$ and $\Theta B$ for detection of pressure with respect to the waveform of the in-cylinder pressure of the internal combustion engine in general.

FIG. 11 shows the relation between the fixed angles $\Theta A$ and $\Theta B$ and the predetermined value $\beta$ for pressure detection with respect to the in-cylinder pressure waveform of the internal combustion engine in general.

Figure 12:
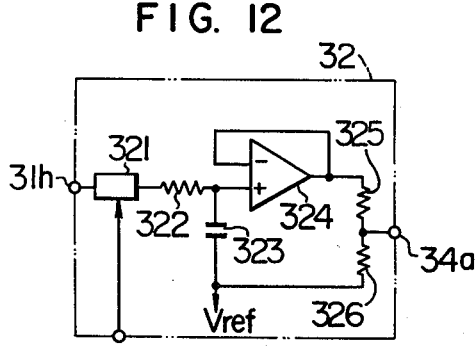
Figure 13:
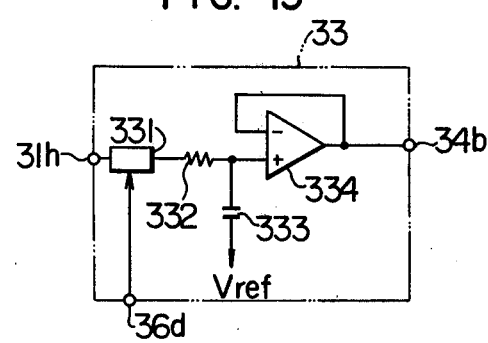

A detail of the first fixed angle pressure detector 32 is shown in FIG. 12, and a detail of the second fixed angle pressure detector circuit 33 is shown in FIG. 13.

In FIG. 11, if the fixed angle $\Theta B$ is placed considerably behind the angle $+\Theta A$ symmetric with the fixed angle $-\Theta A$ with respect the top dead center (TDC), a similar measurement is possible by setting the predetermined value to 1 or less. Further, if the predetermined value $\beta$ is set to less than 1 in FIG. 12 and FIG. 13, the dividing resistors 325 and 326 are added to the first fixed angle pressure detector 32, while the dividing resistors 335 and 336 are removed from the second fixed angle pressure detector 33 to attain the same purpose.

In the above-described embodiment, the fixed angle $-\Theta A$ is detected by the two electromagnetic pickups 12 and 13 and the charge and discharge operation of the capacitor 210. As an alternative method, as shown in FIGS. 7(d) and 7(g), the angles $-\Theta A$ and $\Theta B$ may be directly detected by the two electromagnetic pickups 12 and 13 so that the monostable output (e) detected by the electromagnetic pickup 13 ($M_2$ in FIG. 7) may be obtained from the charge and discharge operation. As another alternative, another electromagnetic pickup may be provided to detect the fixed angle $-\Theta A$ directly.

Further, instead of detecting the angular position by the electromagnetic pickups as the angular position detector 1, a photoelectric system or point system may be used for the same purpose.

Furthermore, the analog circuit of the embodiment under consideration may be replaced by a digital circuit to attain the same purpose of detection.

It will be understood from the foregoing description that in the ignition range detecting system for the internal combustion engine according to the present invention, it is possible to detect the partial combustion immediately preceding to misfire always at a constant level regardless of the running conditions of the internal combustion engine by detecting whether the ratio between the pressure P($+\Theta B$) at the fixed angle $+\Theta B$ during the expansion process for explosion and combustion of the mixture gas in the cylinder of the internal combustion engine and the pressure P($-\Theta A$) at the fixed angle $-\Theta A$ during the compression process preceding to the explosion and combustion of the mixture gas in the cylinder exceeds the predetermined value $\beta$. In this way, the ignition range is detected always at a predetermined level. As a result, not only the air-fuel ratio but also the ignition range attributable to the exhaust gas recirculation or ignition timing is detected widely.

We claim:

1. An ignition range detecting system for the internal combustion engine, comprising a pressure detector for detecting the pressure in a cylinder of the internal combustion engine, a first circuit connected to said pressure detector for detecting the pressure in the cylinder at a first crank angle of the internal combustion engine preceding to the explosion of the air-fuel mixture in said cylinder, a second circuit for detecting the pressure in the cylinder at a second crank angle of the internal combustion engine after the top dead center where the air-fuel mixture in the cylinder explodes and is combusted, a decision circuit for comparing a predetermined value with the ratio between the pressures detected by said first and second circuits respectively thereby to detect an ignition range, and means for detecting the ignition range always at a predetermined level regardless of the running conditions of the internal combustion engine on the basis of the result of comparison of said pressure ratio with said predetermined value.

2. An ignition range detecting system according to claim 1, wherein said pressure detector includes a pressure sensor the output potential of which increases with the pressure in the cylinder.

3. An ignition range detecting system according to claim 1, wherein said decision circuit is supplied with the output of said first circuit and the output of said first circuit and the output of said second circuit, said decision circuit producing an output indicative of complete combustion when the output of said first circuit is larger than the output of said second circuit, said decision circuit producing an output indicative of partial combustion when the output of said first circuit is smaller than the output of said second circuit.

* * * * *